United States Patent
Yonover

(10) Patent No.: US 7,416,643 B2
(45) Date of Patent: Aug. 26, 2008

(54) SOLAR WATER DESALINATION/PURIFICATION DEVICE

(76) Inventor: Robert N. Yonover, 219 Koko Isle Cir., Honolulu, HI (US) 96825

( * ) Notice: Subject to any disclaimer, the term of this patent is extended or adjusted under 35 U.S.C. 154(b) by 667 days.

(21) Appl. No.: 10/967,208

(22) Filed: Oct. 19, 2004

(65) Prior Publication Data
US 2006/0081455 A1    Apr. 20, 2006

(51) Int. Cl.
*B01D 3/02* (2006.01)
*C02F 1/14* (2006.01)
*B01D 1/00* (2006.01)

(52) U.S. Cl. .................. 202/234; 159/903; 159/904; 159/DIG. 15; 202/237; 202/266; 202/267.1; 203/10; 203/86; 203/100; 203/DIG. 1; 203/DIG. 17

(58) Field of Classification Search ............... 159/903, 159/904, DIG. 15; 202/187, 234, 237, 266, 202/267.1; 203/10, 86, 100, DIG. 1, DIG. 17
See application file for complete search history.

(56) References Cited

U.S. PATENT DOCUMENTS

| | | | | |
|---|---|---|---|---|
| 4,107,000 A | * | 8/1978 | Currin | 202/188 |
| 4,545,862 A | * | 10/1985 | Gore et al. | 203/10 |
| 4,698,135 A | * | 10/1987 | Raab | 202/234 |
| 4,959,127 A | * | 9/1990 | Michna | 202/177 |
| 4,966,655 A | * | 10/1990 | Wilkerson, Jr. | 202/234 |
| 5,595,662 A | * | 1/1997 | Sanderson | 202/234 |
| 5,628,879 A | * | 5/1997 | Woodruff | 202/234 |
| 6,440,275 B1 | * | 8/2002 | Domen | 202/234 |
| 7,258,767 B2 | * | 8/2007 | Ter Beek et al. | 203/10 |

FOREIGN PATENT DOCUMENTS

DE     19522239   * 1/1997
GB      1541283   * 2/1979

* cited by examiner

*Primary Examiner*—Virginia Manoharan
(74) *Attorney, Agent, or Firm*—Shlesinger, Arkwright & Garvey LLP

(57) ABSTRACT

A solar water desalination and purification device includes an outer liquid-tight containment and an inner liquid-tight containment disposed within the outer containment. The outer containment collects liquid that forms from condensing water vapor that evaporates within the inner containment and passes through the inner containment material. The inner containment is made from hydrophobic material that allows water vapor to pass through the material as the sunlight evaporates the contaminated water within the inner containment. An inlet communicates with the inner containment for allowing the contaminated water to fill the inner containment. An outlet communicates with the outer containment to allow discharge of condensed water vapor collected within the outer containment to be used as drinking water.

12 Claims, 5 Drawing Sheets

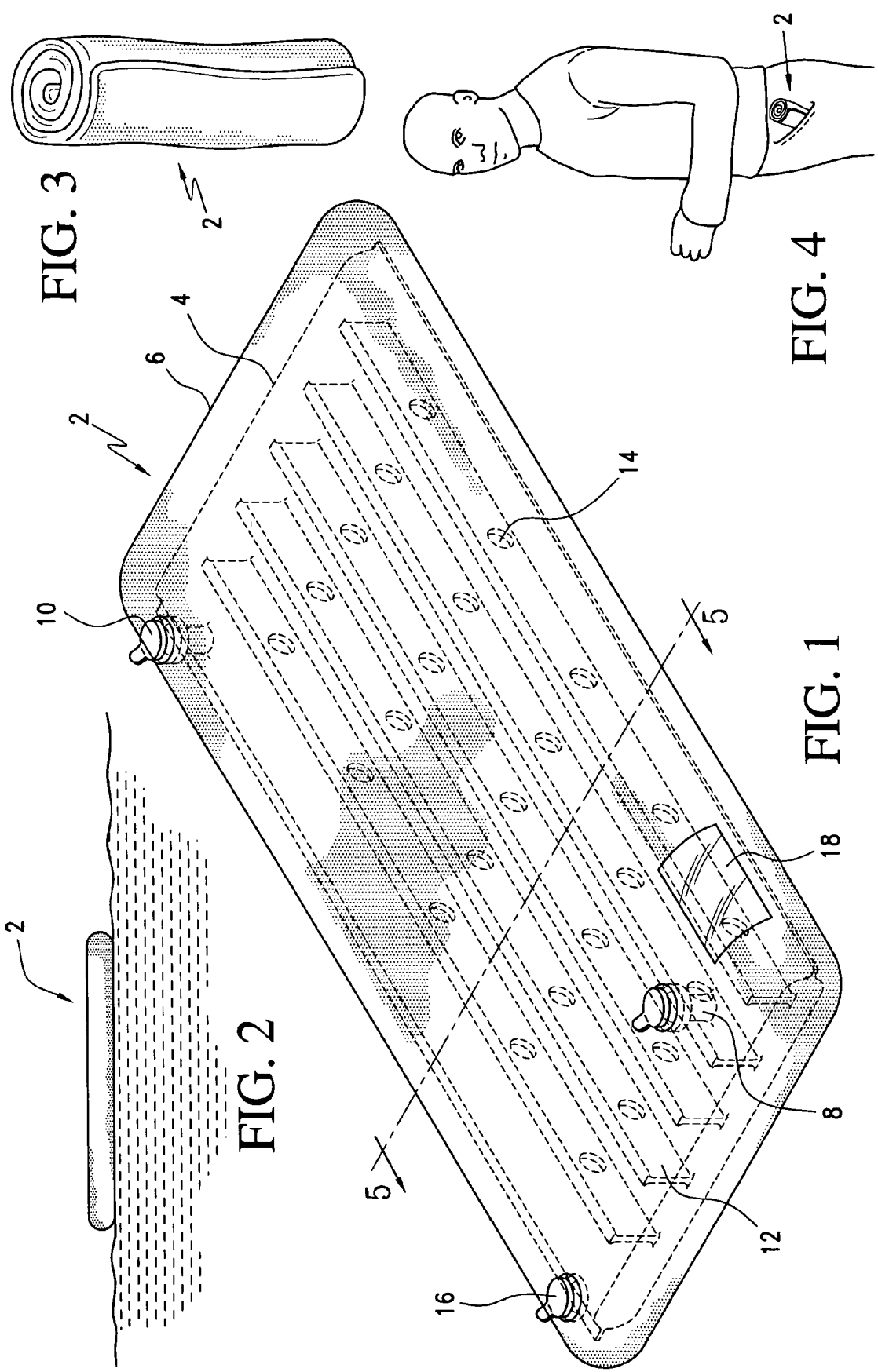

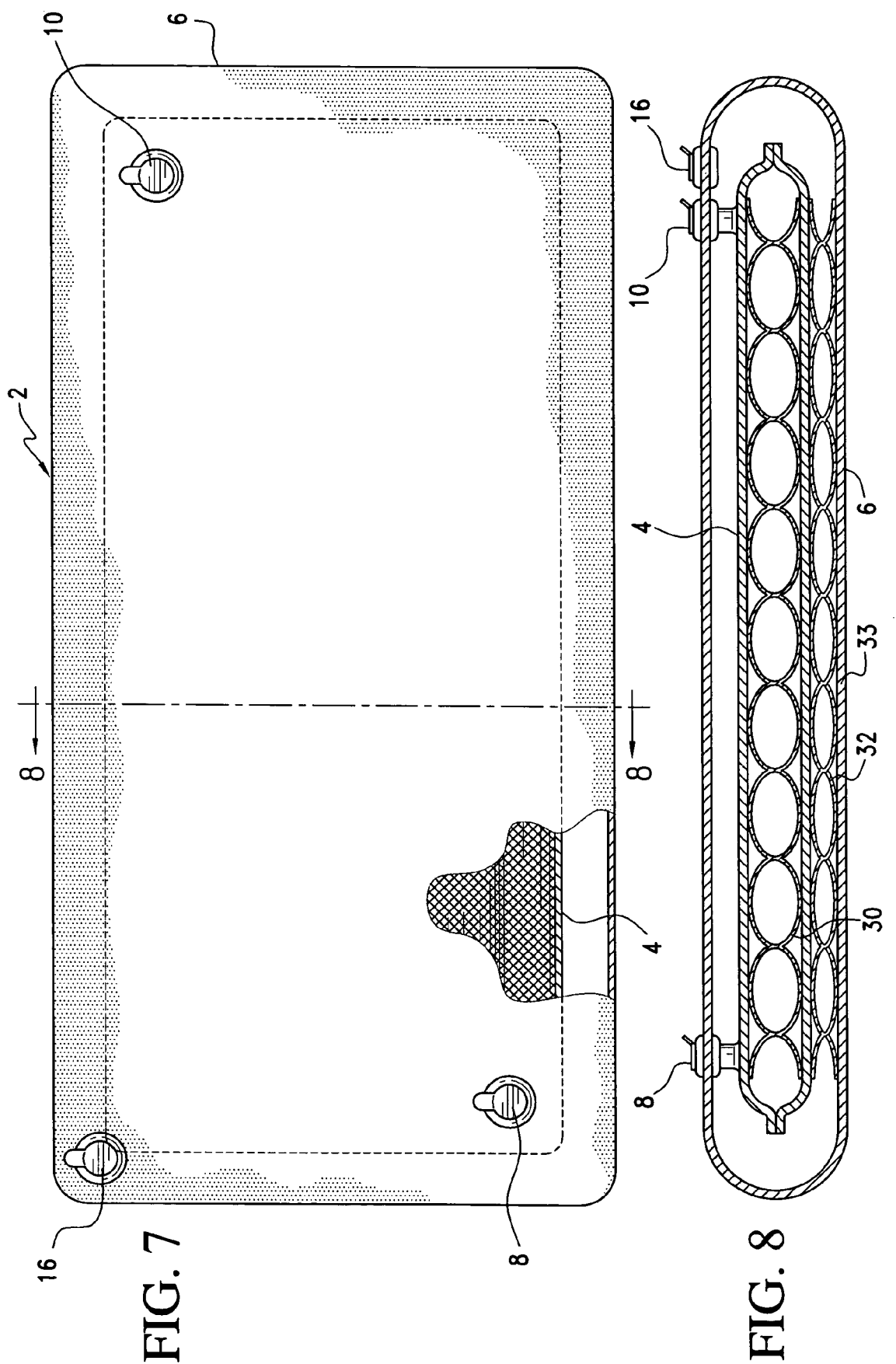

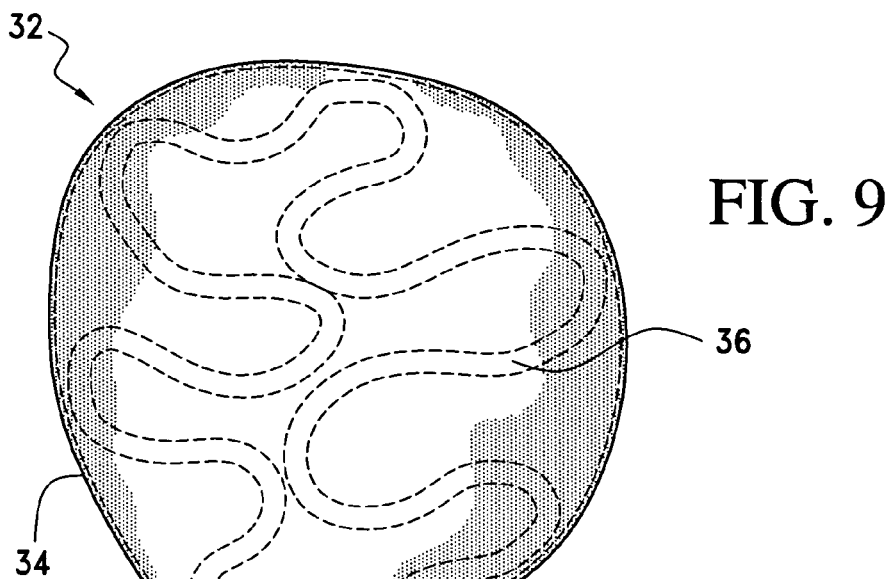
FIG. 9
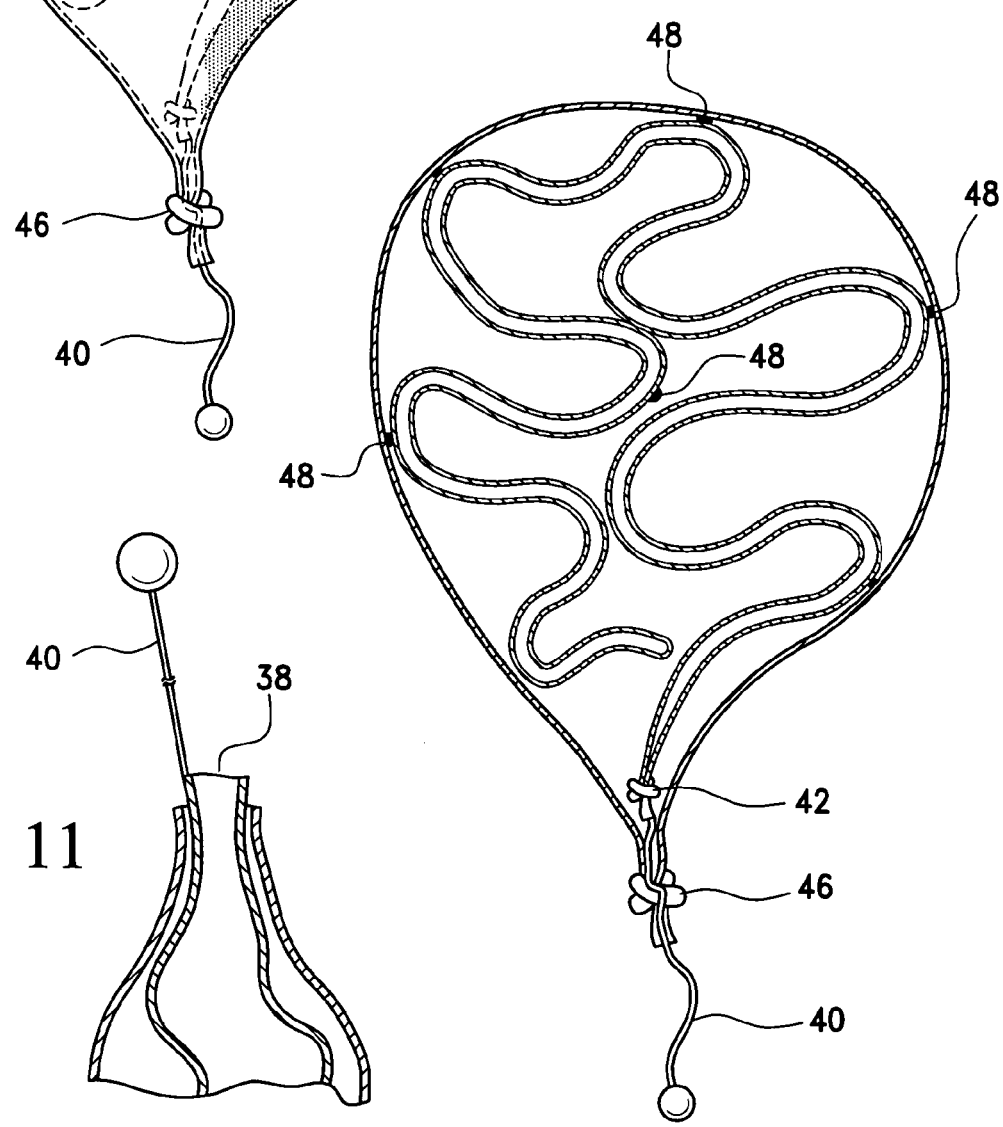
FIG. 10
FIG. 11

SOLAR WATER DESALINATION/PURIFICATION DEVICE

FIELD OF THE INVENTION

The present invention relates generally to devices for converting salt or contaminated water into fresh potable drinking water and particularly to passive devices that utilize solar energy to convert salt/contaminated water into pure vapor within a hydrophobic material pouch that retains all solids and liquids and only permits water vapor to pass to an outer pouch for condensation, collection and subsequent use.

BACKGROUND OF THE INVENTION

In any survival or military scenario, fresh drinking water is always a critical requirement to sustain life. Recreational water enthusiasts and military personnel from all branches of the DoD (especially sea-going troops) can suddenly and unexpectedly find themselves in a survival situation where the absence of drinking water may be fatal. The human body cannot live without fresh water (one cup of water per day is the absolute minimum in ideal environmental conditions). Spare drinking water and reverse-osmosis pumps are commonly available in larger survival kits (e.g., on life rafts and seat kits); however, the ability for individuals to carry emergency drinking water, or the technology to produce drinking water, is non-existent in current recreational or military survival equipment.

Civilian boaters, military personnel, and other sea-going persons, and hikers have a need for a portable personal passive solar water desalination/purification device. There are many documented cases of people going overboard when trying to relieve themselves. If mariners have the ability to always be equipped with an extremely compact water purification system (carried on their person at all times), their chances of surviving an accidental fall overboard will increase significantly. For persons engaged in land-based activities or ground-based military personnel, the device can be carried on their person to enhance their chances of surviving a land-based emergency or mission.

Military and survival experts have expressed the need for a compact water purifying technology that can be carried on the person to complement existing personal passive lifesaving technologies, i.e., ESFS (U.S. Pat. No. 6,066,016)(floatation) and the military-approved SEE/RESCUE® streamer (U.S. Pat. No. 5,421,287).

OBJECTS AND SUMMARY OF THE INVENTION

It is an object of my invention to provide a simple, compact, and passive water purification technology that can be carried on individual personnel.

It is another object of my invention to provide a passive desalination/purification device for converting salt or contaminated water to safe drinking water, thus increasing the chances of a person surviving an emergency situation at sea or on land.

It is still another object of my invention to provide water decontamination for persons living in urban or rural areas without potable water.

It is yet another object of my invention to provide a compact water desalination/purification device that can be folded or rolled into a compact configuration that can be stowed in a lifesaving vessel, such as a raft or boat, until such time as when the device is utilized.

It is another object of my invention to provide a desalination device that is foldable or can be rolled up into a small size and contained in a small pouch that can be mounted on a person's life jacket when not in use.

It is still another object of my invention to provide a desalination device which can be inexpensively produced, providing commercial, private, and military travelers with an increased chance of surviving in an open ocean, any large water mass, desolate land area, or emergency urban/rural contaminated water situations.

In summary, my invention provides a passive solar water desalination and purification device comprises an outer liquid-tight containment and an inner liquid-tight containment disposed within the outer containment. The outer containment collects the liquid that forms from condensing water vapor that evaporates within the inner containment and passes through the inner containment material. The inner containment is made from hydrophobic material that allows water vapor to pass through the material as the sunlight evaporates the contaminated water within the inner containment. An inlet communicates with the inner containment for filling with the contaminated water. An outlet communicates with the outer containment to allow discharge of condensed water vapor collected within the outer containment to be used as drinking water.

These and other objects of the present invention will become apparent from the following detailed description.

BRIEF DESCRIPTIONS OF THE DRAWINGS

FIG. 1 is a perspective view of a solar water desalination and purification device made in accordance with my invention.

FIG. 2 shows the device of FIG. 1 floating on a body of water.

FIG. 3 is the device of FIG. 1 shown rolled-up for stowage.

FIG. 4 shows the rolled up device of FIG. 1 being carried in a person's pocket.

FIG. 7 is a top plan view of another embodiment of the device of FIG. 1.

FIG. 8 is a cross-sectional view taken along line 8-8 of FIG. 7.

FIG. 9 is another embodiment of my invention.

FIG. 10 is a cross-sectional view of FIG. 9.

FIG. 11 is an enlarged cross-sectional view of the neck portion of the balloon of FIG. 9.

DETAILED DESCRIPTION OF THE INVENTION

Figure 5:
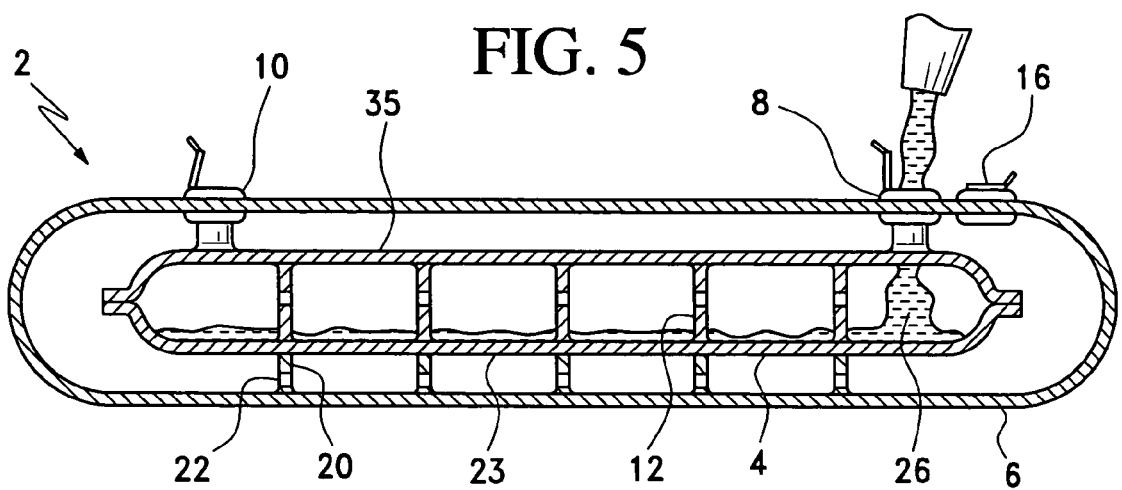
FIGS. 5 and 6 are cross-sectional views taken along line 5-5 of FIG. 1, showing the device being filled with salt/contaminated water and then being subjected to solar energy for the evaporation process to produce purified water.

A passive solar water desalination and purification device 2 made in accordance with my invention is disclosed in FIG. 1. The device 2 comprises an elongate internal pouch or containment 4 made of a hydrophobic material which is liquid-tight to salt and contaminated water but allows water vapor to pass through. The pouch 4 is disposed within an elongate outer pouch or containment 6. The inner pouch 4 may be dark-colored, such as black, and the outer pouch 6 transparent. The outer pouch 6 can also be colored. The containments or pouches 4 and 6 are preferably in the shape of an envelope, substantially thin and planar to optimize the process of evaporating the salt/contaminated water in the inner hydrophobic pouch 4. The pouches 4 and 6 may be made from sheet plastic materials joined together along their outer edges using standard methods, preferably by gluing and/or sewing. Heat welding may also be used or any combination of methods well known to a person skilled in the art.

The inner pouch 4 includes a closeable inlet 8 to allow the salt or contaminated water to be poured into the pouch 4. A closeable outlet 10, preferably disposed diagonally across from the inlet 8, provides a relief opening for the trapped air inside to facilitate the filling of the inner pouch 4. The inlet 8 and outlet 10 can also be advantageously used for flushing the inner pouch 4 of salt crystals and other solid after use when the emergency has abated.

The inner pouch 4 may include supports 12 with a plurality of openings 14 to permit the salt or contaminated water to fill the inner pouch 4 in a uniform thin layer and advantageously prevent the water from ponding in any one area of the pouch, thus maximizing the surface area of the water to be evaporated (i.e., by minimizing the thickness of the layer of the water, the quicker and more efficiently the water can be evaporated). The inner pouch 4 is made from a hydrophobic material that acts as a filter, allowing water vapor to pass through the material, but blocking the flow of salt or contaminated water. The supports 12 advantageously keep the walls of the inner pouch 4 parallel to each other so that the salt/contaminated water inside is kept to a substantially uniform thickness.

The outer pouch 6, which functions as a collection containment for the water vapor passing through the hydrophobic material of the inner pouch 4, has a closeable drinking outlet or spout 16. A transparent inspection window 18 on the outer pouch 6 (in the case where the outer pouch 6 is dark-colored) enables the user to visually check the amount of fresh water being generated from the water vapor that condenses on the inner surface of the outer pouch 6.

The device 2 is designed to float on water and the outer pouch 6 may be inflated through the closeable spout 16 to add increased buoyancy, as shown in FIG. 2. The device 2 may be attached by a lanyard to a user's life jacket so that the wind or water currents do not separate the device from the user in heavy seas. The outer pouch 6 is preferably black-colored to ensure that the highest level of heat is captured from solar radiation to heat up the evaporation pouch 4 to convert the salt/contaminated water to the vapor state.

The device 2 is preferably made from flexible materials so as to be foldable or may be rolled-up to a minimum volume to provide a compact package, preferably to pocket size, that can be carried on the person, as shown in FIG. 4, making the device convenient to be carried by the user at all times, or stowed in survival kits for boaters, aviators, hikers, military personnel, and rural/urban water emergencies. When needed, the device 2 can be removed from its case and unfurled/unfolded on the surface of the water (or land) for use. The device 2 when not in use can also be easily carried on a person's lifejacket. Depending on the application and stowage space available, the device can be constructed to any length or size. The larger the device, the quicker the conversion and larger amount of water that will be produced—all in a passive manner, requiring the operator to simply wait for the conversion to take place and repeating the process as required.

Referring to FIG. 5, the inner pouch 4 is advantageously spaced from the interior surface of the outer pouch 6 by means of suitable supports 20 that include a plurality of holes 22 to allow the condensing water vapor to freely distribute on the bottom surface of the outer pouch 6. The inlet 8 and outlet 10 advantageously extend through the interior of the outer pouch 6 and communicate only with the interior of the inner pouch 4. In this way, the salt/contaminated water is completely contained within the inner pouch 4 and mixing with the condensed water vapor collecting in the outer pouch 6 is prevented.

Figure 6:
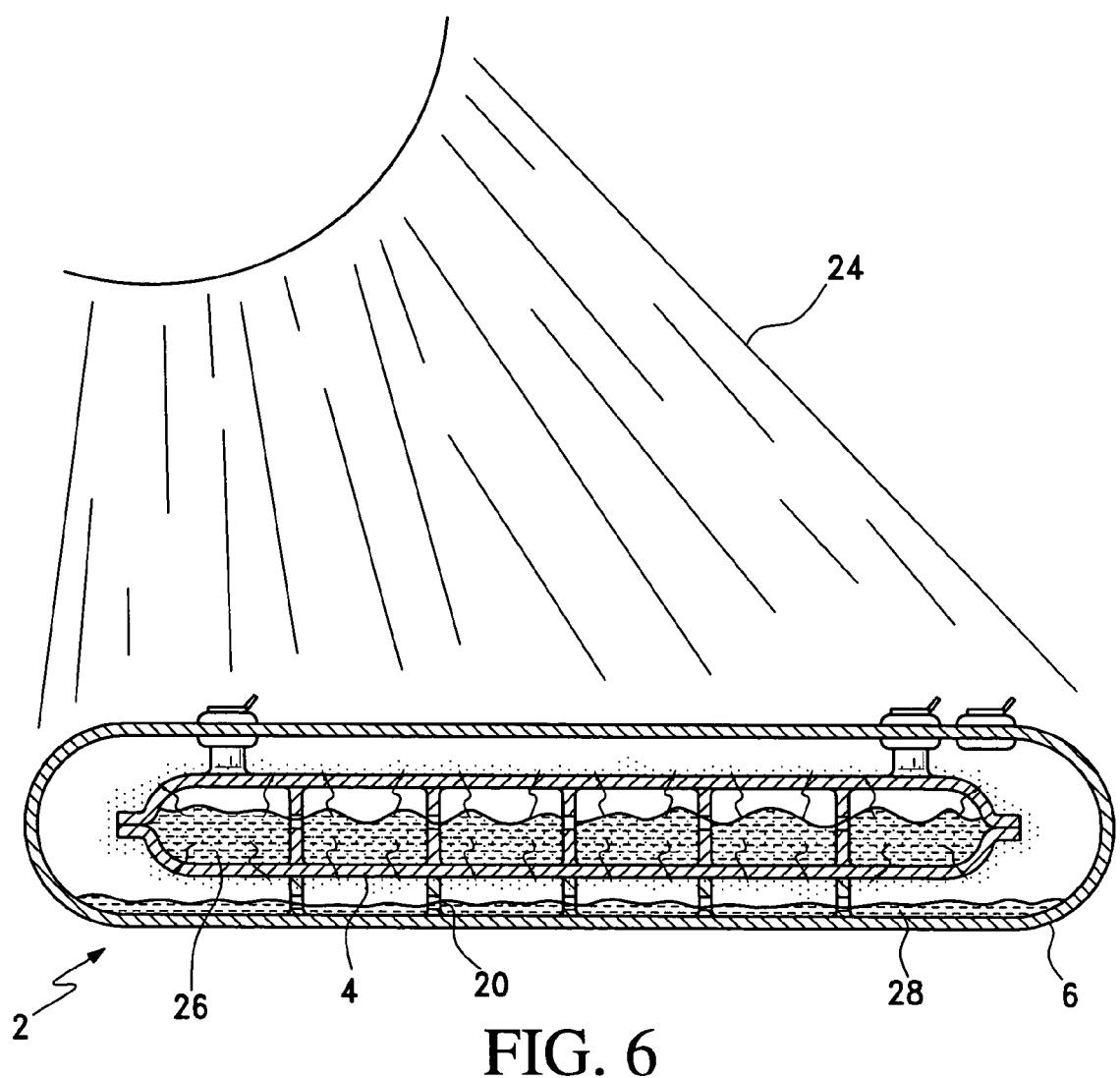
Figure 12:
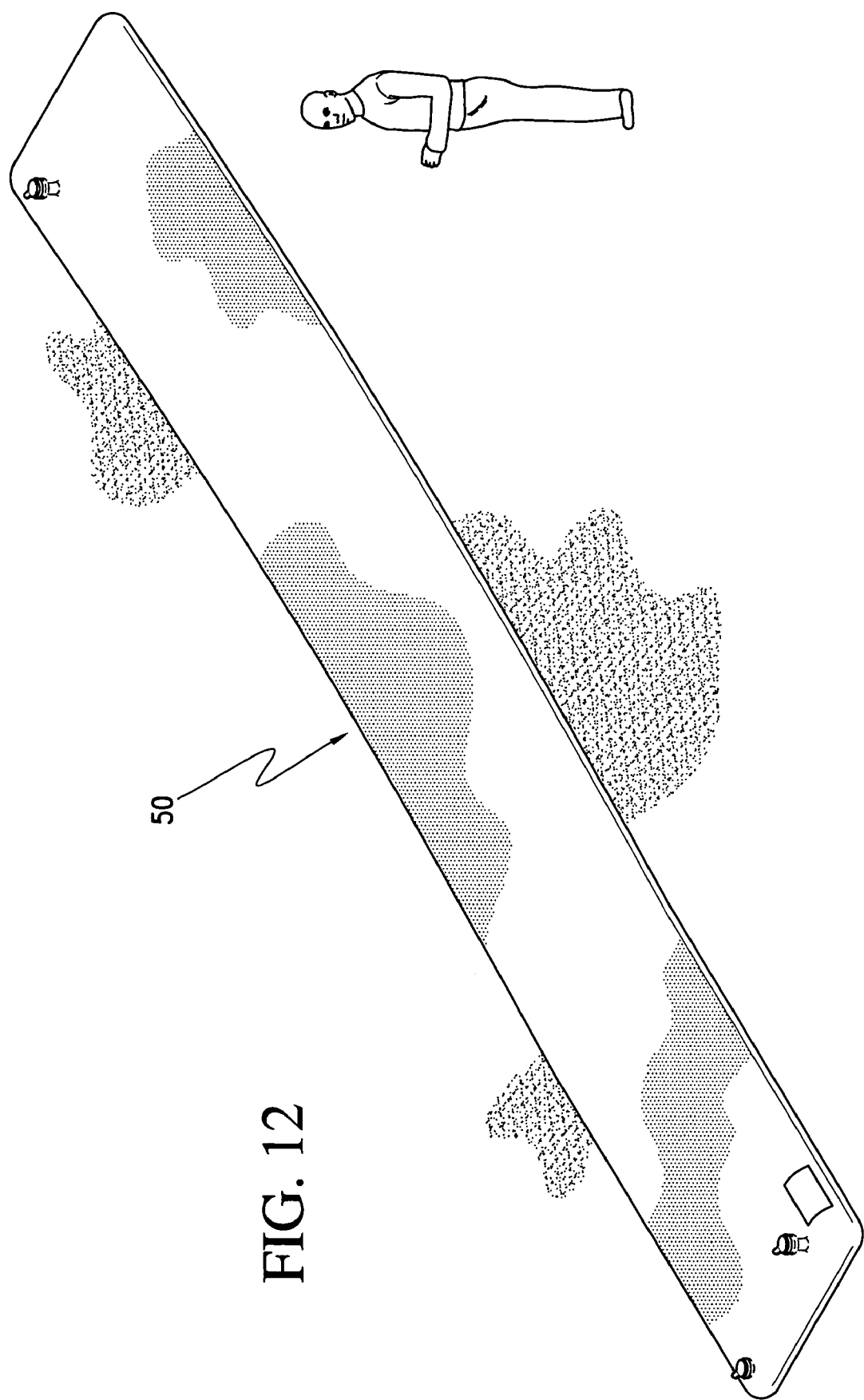
FIG. 12 is a perspective view of a large scale embodiment of the device of FIG. 1.

Referring to FIG. 6, solar energy generally depicted at 24 heats up the outer pouch 6 and is transferred to the salt/contaminated water 26 within the inner pouch 4, causing the salt/contaminated water to evaporate. The hydrophobic material of the pouch 4 allows the water vapor to pass through the material. The water vapor then condenses onto the relatively cooler inner surface of the outer pouch 6 and collects as purified water generally shown at 28.

Referring back to FIG. 5, salt or contaminated water is loaded through the inlet 8 and is dispersed evenly throughout the inner pouch 4. The supports 12 advantageously allow the water to spread out, since the supports 12 would tend to keep the bottom wall 23 of the inner pouch 4 substantially flat, thereby exposing a greater surface area of the water to the solar energy. Solar energy heats up the outer pouch 6, which is preferably black-colored to provide the lowest possible reflection factor. The heat energy is then transmitted by heat transfer processes well known to a person skilled in the art to the inner pouch 4 and the salt/contaminated water 26 within. Once heating is sufficient, the liquid water is converted into pure water vapor (via evaporation) and passes through the hydrophobic material of the inner pouch 4. The microscopic pore spaces in the hydrophobic material permit only water vapor to pass, but not solids or liquids whose molecules are too large for the pore sizes. The vapor then collects on the inside surface of the outer pouch 6 and condenses, essentially producing highly purified distilled water suitable for drinking purposes.

FIGS. 7 and 8 disclose another embodiment of the device 2, where the internal supports 30 and 32 are made from flexible plastic mesh-type material, which can be in the form of a plurality of longitudinally connected tubes. The supports can be co-extruded with the hydrophobic material. The mesh structure provides support to keep the inner pouch 4 relatively thin and planar while providing separation between the bottom wall 23 of the inner pouch 4 and the bottom wall 33 of the outer pouch 6 and allowing the water in the respective pouch to freely move around. Since the outer pouch 6 is exposed to the ambient temperature or may be floating on a body of saltwater, the bottom wall 33 may be at a lower temperature than the bottom wall 23. Solar energy absorbed by the salt/contaminated water within the inner pouch 4 is thereby advantageously insulated from the colder bottom wall 33. Inflating the outer pouch 6 will also keep the inner pouch walls from touching the other pouch walls to prevent heat loss.

It should be understood to a person skilled in the art that other means for separating the walls of the inner pouch 4 so that they are substantially parallel to each other so that the salt/contaminated water will spread out to an even layer may be used. For example, the supports 12 may be made of a multitude of substantially equal length strings, with their one ends attached to the wall 23 and their other ends attached to the opposite wall 35, similar to the "drop-stitch" structure disclosed in my U.S. Pat. No. 6,066,016, which is hereby incorporated by reference. When the inner pouch 4 is filled with water, the walls 23 and 35 move away from each up to the length of the strings, thus keeping the walls substantially parallel to each other.

Referring to FIGS. 9-11, another embodiment of a portable personal solar water desalination/purification device 32 is disclosed. The device 32 comprises an outer collection containment 34 and a hydrophobic evaporation tubing 36 disposed within the containment 34. The outer containment 34 is in the form of an inflatable balloon which can be conveniently deflated for stowage and inflated during use. When deflated, the device 32 may be conveniently carried on a person's body. The outer containment 34 is preferably black-colored to maximize solar absorption. The tubing 36 is liquid-tight to salt/contaminated water but allows water vapor to pass through. The tubing 36 has an opening 38 through which the salt/contaminated water is poured into the tubing. A string 40 tied to the open end of the tubing allows the user to pull the end of the tubing out of the balloon for filling purposes. The open end of the tubing is simply closed with a knot 42 and the sealed opening is then pushed inside the balloon. The neck of the balloon 44 is also closed with a knot 46 after the balloon is inflated. The tubing is secured by glue or other standard means to the inside of the balloon at several places, such as generally indicated at 48 to advantageously prevent the tubing from bunching together. After the tubing has been filled with salt/contaminated water, the opening 38 is sealed with the knot 42, the end of the tubing is closed and disposed inside the balloon while keeping the string 40 outside. The knot 46 is then made to seal the balloon in the inflated state. Solar energy then heats up the interior of the balloon, causing the salt/contaminated water to evaporate, with the water vapor passing through the hydrophobic material of the tubing. The water vapor condenses on the inside surface of the balloon and collects within until a sufficient amount has been generated for use. To draw the purified water out of the balloon, the knot 46 is untied, allowing the water to flow out through the open neck of the balloon.

It should be understood that my invention described herein in not limited to any particular size or dimensions. The larger the length and width of the device 2, for example, the greater the amount in volume of safe drinking water that can be converted. Referring to FIG. 11, a large scale embodiment of a water desalination/purification device 50 is disclosed. It is similar to the device 2 except that it is made substantially larger for greater purified water production. For example, the device 50 can be 25 ft. long and 5 ft. wide. The device 50 can be used for life rafts, boats, aircrafts and rural/urban communities that require the conversion of contaminated water into safe drinking water.

The hydrophobic material is available from BHA Technologies, Inc., 8800 East 63rd Street, Kansas City, Mo. 64133. It is made from a polytetrafluoroethylene (PTFE) membrane, also known as TEFLON (registered trademark). When PTFE is expanded, millions of microscopic pores are created in a three-dimensional membrane structure. These pores are smaller than almost any type of airborne or water borne particulate, yet large enough to allow for the passage of gas molecules, thus enabling water vapor to be extracted from salt or contaminated water following evaporation by solar energy.

My invention requires no moving parts, providing a simple and inexpensive passive means to convert salt water (and contaminated water) into potable water for survival purposes. The compact device can be carried on the person and can be manually deployed to provide a person with the minimum required amount of drinking water on an extended period of time until help can arrive. My invention increases the likelihood of a person surviving an extended time lost at sea or on land without naturally-occurring fresh drinking water in an inexpensive, continuous manner, thus making travelers, workers, water enthusiasts, or military personnel more relaxed when on the water or in desolate land areas.

The device 2 can be rigid or flexible so it can be rolled or folded into a compact configuration. Where the device is rigid, the supports will not be required inside the inner containment.

The device can be used in the cruise-ship industry, recreational boating and sailing, kayaking and many other water-based activities where persons are at risk of falling overboard into the water, as well land-based activities, such as hiking, camping, climbing, etc.

My invention is a survival/lifesaving device that provides an inexpensive, passive, self-activated, non-electronic desalination device that can be utilized repeatedly and continuously to sustain human life.

My invention provides a state of the art emergency desalination/water decontamination device for persons lost at sea or on land that is: (1) passive and can be used repeatedly; (2) small enough to be carried on the person; and (3) simple and inexpensive enough to be supplied to all water-based recreational enthusiasts, overseas travelers, and military personnel and is not subject to electronic malfunctions.

It is to be understood that my invention is not limited in its application to the details of construction and arrangement of parts illustrated in the accompanying drawings since the invention is capable of other embodiments and of being practiced or carried out in various ways. Also, it is to be understood that the terminology and phraseology employed herein is for the purpose of description and not limitation.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A solar water desalination and purification device, comprising:
   a) a liquid-tight outer containment, said outer containment collecting liquid that forms from condensing water vapor;
   b) an inner containment disposed within said outer containment, said inner containment being liquid-tight to contaminated water, said inner containment is made from hydrophobic material that allows water vapor to pass through said material as the sunlight evaporates the contaminated water within said inner containment;
   c) said outer and inner containments are substantially thin and planar in the shape of an envelope;
   d) said inner containment including first and second opposed sheets of material;
   e) a plurality of supports to separate said opposed sheets from each other such that said opposed sheets are substantially parallel to each other so that the contaminated water inside said inner containment is kept to a substantially uniform thickness;
   f) an inlet communicating with said inner containment for allowing the contaminated water to fill said inner containment; and
   g) an outlet communicating with said outer containment to allow discharge of condensed water vapor collected within said outer containment to be used as drinking water.

2. A solar water desalination and purification device as in claim 1, wherein said inner containment includes a relief opening.

3. A solar water desalination and purification device as in claim 1, wherein said supports includes a plurality of openings to allow the contaminated water to flow throughout the interior of said inner containment.

4. A solar water desalination and purification device as in claim 1, wherein said supports are made of plastic mesh.

5. A solar water desalination and purification device as in claim 1, wherein said hydrophobic material is expanded polytetrafluoreethylene membrane.

6. A solar water desalination and purification device as in claim 1, wherein:
   a) said inner and outer containments are flexible so as to be rolled into a compact configuration for stowage.

7. A solar water desalination and purification device as in claim 1, wherein said outer containment includes an inspection window to visually inspect the interior of said outer containment.

8. A solar water desalination and purification device as in claim 1, wherein:
   a) said inner containment includes a bottom wall spaced from a bottom wall of said outer containment; and
   b) supports to separate said bottom walls from each other.

9. A solar water desalination and purification device as in claim 8, wherein said supports include a plurality of openings.

10. A solar water desalination and purification device as in claim 1, wherein:
    a) said inner containment is dark-colored; and
    b) said outer containment is transparent.

11. A solar water desalination and purification device, comprising:
    a) a liquid-tight outer containment, said outer containment collecting liquid that forms from condensing water vapor, said outer containment is balloon-shaped;
    b) an inner containment disposed within said outer containment, said inner containment being liquid-tight to contaminated water, said inner containment is made from hydrophobic material that allows water vapor to pass through said material as the sunlight evaporates the contaminated water within said inner containment, said inner containment is serpentine along its length, said inner containment being attached to an inside surface of said outer containment;
    c) an inlet communicating with said inner containment for allowing the contaminated water to fill said inner containment; and
    d) an outlet communicating with said outer containment to allow discharge of condensed water vapor collected within said outer containment to be used as drinking water.

12. A solar water desalination and purification device as in claim 11, wherein said inlet is disposed at one end of said serpentine inner containment adjacent a neck of said balloon-shaped outer containment.

* * * * *